United States Patent [19]
Bergquist, Jr.

[11] 3,848,332
[45] Nov. 19, 1974

[54] COMMUTATOR RING BANDING

[75] Inventor: Carl R. Bergquist, Jr., Hopkins, Minn.

[73] Assignee: The Bergquist Co., Inc., Minneapolis, Minn.

[22] Filed: Aug. 13, 1973

[21] Appl. No.: 387,631

Related U.S. Application Data

[63] Continuation of Ser. No. 208,310, Dec. 15, 1971, abandoned.

[52] U.S. Cl.................... 29/597, 29/447, 156/86, 310/43, 310/236
[51] Int. Cl. ............................................ H01n 43/00
[58] Field of Search ............ 29/596, 597, 598, 447; 310/233, 236, 235, 42, 43; 156/85, 86

[56] References Cited
UNITED STATES PATENTS

| | | | |
|---|---|---|---|
| 3,192,424 | 6/1965 | Jones | 310/236 |
| 3,467,761 | 9/1969 | Plummer | 156/86 UX |
| 3,542,229 | 11/1970 | Beyerlein et al. | 156/86 X |
| 3,582,457 | 6/1971 | Barthell | 156/86 UX |
| 3,607,496 | 9/1971 | Kissell | 156/86 |

Primary Examiner—C. W. Lanham
Assistant Examiner—Carl E. Hall

[57] ABSTRACT

A method for electrically insulating the outer end surface of the commutator of an electrical motor from the motor shaft support means in an electrical motor assembly which includes a central shaft, armature and commutator means mounted on said shaft, and load bearing support means for said shaft adjacent the ends thereof, and annular spacer means disposed along said shaft and separating said commutator means from said load bearing support means. The method comprises applying a layer of an electrical insulating adhesive composition to the outer surface of the first insulation layer, and thereafter placing a generally flat endless band of heat shrinkable fluorinated ethylene-propylene over the adhesive film, so as to cover the base bonding surface with the band. Thereafter, the heat shrinkable band and adhesive film is exposed to thermal energy adequate to cause shrinkage of the band until firmly bonded to the adhesive on the base bonding surface. Alternatively, a first generally rigid insulation layer such as glass fiber may be applied to the outer surface of the annular spacer means over the adhesive, and a second adhesive layer is then applied over the rigid insulation to receive the heat shrinkable film.

10 Claims, 5 Drawing Figures

PATENTED NOV 19 1974

3,848,332

COMMUTATOR RING BANDING

This is a continuation, of application Ser. No. 208,310, filed Dec. 15, 1971 for Commutator Ring Banding now abandoned.

BACKGROUND OF THE INVENTION

The present invention relates to an improved technique for electrically insulating or isolating the outer end surface of the commutator portion of an electric motor from the motor shaft support means, and more specifically to such a technique which utilizes a heat shrinkable band of fluorinated ethylene-propylene, commonly referred to as FEP and sold commercially under the name FEP or 100-FEP, as the outer exposed surface for the electrical insulation layer.

In the traction motor industry, electric motors are frequently used as sources of propulsion, these motors being extremely heavy, and requiring effective electrical insulation layers along the commutator portions for extended life. One of the major problem areas involves the effective isolation of the commutator segment or portion of the motor from the load bearing support means for the shaft, such as the main shaft bearings. In the past, this area was insulated electrically from the motor housing or bearings by commutator ring banding techniques which, while effective for certain purposes, were subject to flash-over conditions. Flash-over commonly occurs at times when the motors are operating under extreme load conditions, or when the motor environment becomes adverse either from the standpoint of temperature, dust, oil films, or the like. Layers of carbon or other conductive materials are collected along the surface of the insulation and leakage or arcing occurs.

At the present time, a standard method for commutator ring banding includes the placing of a first generally rigid electrical insulation material over the outer surface of the annular spacer separating the commutator from the load bearing support means, and thereafter wrapping the first layer with a layer of glass fiber reinforced electrical insulating adhesive composition. Commonly used glass fiber reinforced electrical insulation material is epoxy or polyester saturated glass cord curable by exposure to elevated temperatures. This technique suffers from the disadvantage of becoming subjected to flash-over at high temperatures. Flash-over has been found to generate carbon tracks in the area of the flash-over, the track, in turn, creating an electrically conductive path which will eventually destroy the electrical integrity of the commutator. Furthermore, the surface was rough and frequently established a collection path for conductive debris such as carbon.

An alternate technique that has been employed utilizes the wrapping of multiple layers of a tape of tetrafluoroethylene (TFE) over a glass fiber reinforced electrical insulating adhesive. This system suffers from installation difficulties since it requires several tape wraps of tetrafluoroethylene about the surface, and these wraps provide a seam which promotes tracking. The TFE tape also has a rough surface that collects carbon and promotes flash-over.

SUMMARY OF THE INVENTION

The concept of the present invention includes the use of a generally rigid electrical insulation, such as Mica, or the like, over the base surface of the annular spacer means separating the commutator from the load bearing support means. Thereafter, a high temperature resistant epoxy, electrically insulating adhesive material is applied over the surface of the generally rigid material to form an adhesive bonding base. Later, a generally flat endless band of heat shrinkable fluorinated ethylene-propylene is applied over the adhesive film, with the band thereafter being exposed to thermal energy adequate to cause shrinkage of the fluorinated ethylene-propylene until the band is firmly bonded to the adhesive layer. At this point, the band is not firmly bonded to the adhesive, however, this occurs as soon as the adhesive is finally cured by continued exposure to heat. The technique has been found to be highly adapted for use in connection with traction motors, with the system permitting application in a variety of environments, and not requiring the application of multiple layers of insulation. The technique provides a product which is resistant to flash-over, and which is capable of operation at temperatures substantially greater than those previously possible.

Therefore, it is a primary object of the present invention to provide an improved technique for electrically insulating the outer end surface of the commutator portion of an electrical motor from the motor shaft support means utilizing heat shrinkable fluorinated ethylene-propylene banding for the outer exposed electrical insulating surface.

It is yet a further object of the present invention to provide an improved method for electrically insulating the outer end surface of the commutator of an electrical motor from the motor shaft support means which includes applying a generally rigid electrical insulating material to the base surface, covering the base surface with a layer of an electrically insulating adhesive, and thereafter applying a band of heat shrinkable fluorinated ethylene-propylene over the adhesive film, and ultimately exposing the heat shrinkable band to thermal energy adequate to cause shrinkage in the band until bonded to a base adhesive layer.

Other and further objects of the present invention will become apparent to those skilled in the art upon a study of the following specification, appended claims, and accompanying drawing.

DESCRIPTION OF THE PREFERRED EMBODIMENT

Figure 1:
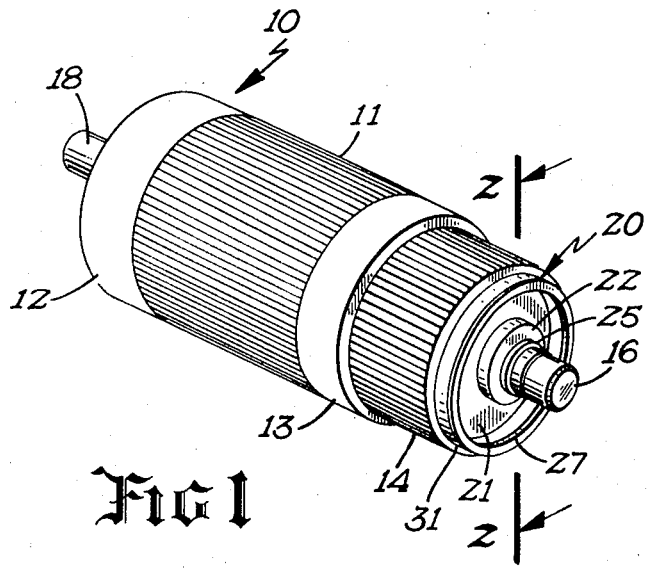
FIG. 1 is a perspective view of the rotor assembly of an electrical motor having the commutator electrically insulated from the load bearing support means by the technique of the present invention.

The technique of the present invention will be described in relation to the electrical motor assembly shown in the drawing, particularly rotor assembly generally designated 10 which includes an armature core 11, along with end plates 12 and 13 and commutator assembly 14. The rotor is formed about motor shaft 16, with a load bearing support means shown at 17 and 18. In order to electrically insulate the motor shaft support means or motor housing from the commutator assembly, an annular spacer means such as is shown generally at 20 is provided. Annular spacer means 20 includes end plate 21 which is secured to slotted collar member 22 disposed inwardly of the commutator assembly 14. The commutator and coil support sleeve 23 is provided adjacent and in back of collar 22. Retaining rings are shown for the structure at 24, retainer rings 24 being disposed outwardly from spacer ring 25.

Annular spacer means 20 further includes the annular base sleeve 27, normally a steel sleeve, which forms a bed for the individual commutator segments. This bed member 27 is covered with a layer of generally rigid electrical insulating material such as Mica layer 28, and a fiberglass reinforced electrical insulating adhesive composition is preferably, but not necessarily, provided over the Mica layer 28, as at 30. The heat shrinkable fluorinated ethylene-propylene band is shown in the structure at 31 and, as indicated, provides the outer exposed surface for the annular spacer means 20.

In carrying out the application of the insulating material to the surface of the annular spacer means, the first generally rigid insulation layer, such as Mica, is applied to the outer surface of the sleeve member 27, as indicated. Thereafter, a film of an electrical insulating epoxy adhesive composition is applied to the outer surface of the first insulation layer to form an annular base bonding surface. It has been found that a layer of glass fiber may be placed over epoxy material, with a second layer of epoxy being applied to the glass. Epoxy adhesive is preferred for the bonding, with the epoxy material being sufficiently strong, heat resistant, and capable of adhering firmly to the fluorinated ethylene-propylene. Fluorinated ethylene-propylene having an etched or textured surface to enhance bonding is commercially available.

For a commutator structure utilizing an annular spacer means having an outer diameter of about 15 inches, and a width of approximately 1¼ inches, a heat shrinkable fluorinated ethylene-propylene band having a thickness of 10 mils, a width of 1¼ inches, and a pre-shrink diameter of about 16 inches is selected. This band is placed over the adhesive layer or film covering the wrap of glass fiber reinforced electrical insulation, and thereafter exposed to thermal energy adequate to cause shrinkage therein until the band is shrunk onto the base bonding surface of fiber reinforced adhesive. A temperature in the range of 350° F. is adequate to cause shrinkage of heat shrinkable fluorinated ethylene-propylene, with the structure having a free or non-restricted shrink diameter of approximately 70 percent of its original diameter. Thereafter the entire structure is exposed to an elevated temperature to complete the cure of the epoxy base band, with a curing temperature of approximately 325° F. for a period of four hours having been found to be sufficient.

Fiberglass tape is commercially available. Thermally cured epoxy base adhesive is available from Sterling Varnish Co., under the code name "U-300". Preferably, adequate adhesive is employed so as to cause some extrusion of adhesive from opposed ends of the fluorinated ethylene-propylene layer, and such a result has been found to be desirable from the standpoint of resisting flash-over in the finished product.

Figure 3:
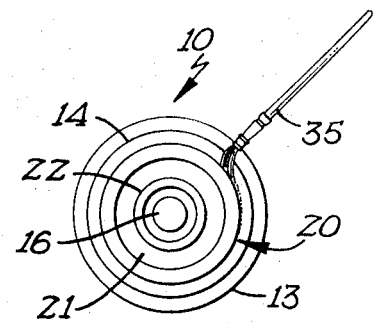
FIG. 3 is an end elevational view of the commutator end of the structure shown in FIG. 1, and illustrating one of the steps of the present invention.
Figure 2:
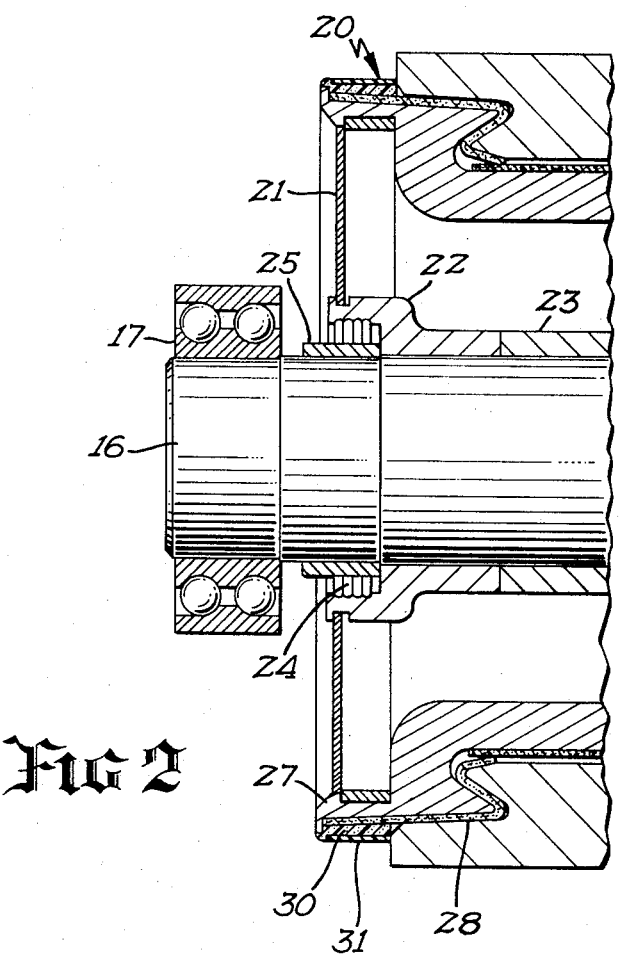
FIG. 2 is a detail sectional view on an enlarged scale taken along the line and in the direction of the arrows 2—2 of FIG. 1, FIG. 2 illustrating the disposition of the motor bearings about the ends of the motor shaft.
Figure 4:
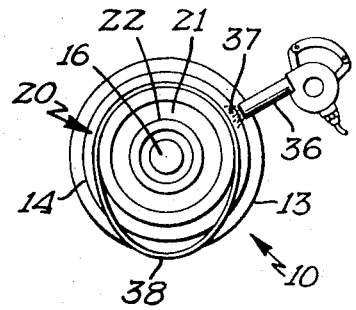
FIG. 4 is a view similar to FIG. 3, and illustrating the shrinkage operation being conducted on the device.
Figure 5:
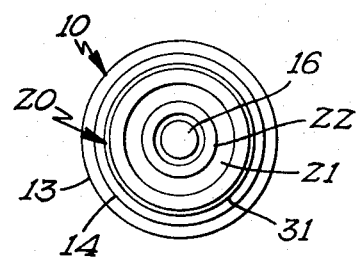
FIG. 5 is a view similar to FIG. 3, and illustrating the armature structure following the completion of the application of the improved insulating assembly to the outer end surface of the commutator of the motor.

In order to further disclose the details of the practicing of the present invention, attention is directed to FIGS. 3 and 4 of the drawing wherein certain details of the technique are illustrated. In FIG. 3, the operation includes the application of a film of adhesive to the spacer area 20 utilizing a brush element 35 in contact with the annular area. In FIG. 4, a heater element 36 is being utilized to deliver a blast of hot gases, as at 37, onto the surface of distended fluorinated ethylene-propylene band 38. The structure in FIG. 5 shows the process complete.

I claim:

1. The method of preparing an electrically insulating layer along the outer annular end surface of the commutator of an electrical motor to isolate the commutator from adjacent motor shaft support means in an electrical motor assembly which includes a central shaft, armature and commutator means including an annular commutator supporting sleeve, with said commutator means being mounted on said shaft, load bearing support means for said shaft adjacent the ends thereof, and annular spacer means disposed along said shaft for supporting said commutator supporting sleeve and separating said commutator means from said load bearing support means, said method comprising:

a. applying a first generally rigid insulation layer to the outer edge surface portion of said annular commutator supporting sleeve to insulate the same therefrom;
   b. applying a film of a curable electrical insulating adhesive composition to the outer surface of said first insulation layer to form an annular base bonding surface;
   c. applying a generally flat endless band of heat shrinkable fluorinated ethylene-propylene over said adhesive film to cover said base bonding surface, said band normally having a diameter slightly greater than the diameter of said annular spacer means, but slightly less than the diameter of said annular spacer means upon undergoing thermal shrinkage; and
   d. exposing said band to thermal energy adequate to cause thermal shrinkage therein until said band shrinks to a normal diameter significantly less than that of of said annular spacer means and becomes firmly bonded to said base bonding surface and the adhesive film fully cured.

2. The method as defined in claim 1 being particularly characterized in that said electrically insulating adhesive composition is an epoxy base adhesive, and wherein said adhesive is subjected to elevated temperatures until cured to a rigid synthetic resinous mass.

3. The method as defined in claim 2 being particularly characterized in that said adhesive film is covered with a layer of glass fiber and a second layer of adhesive is applied over the glass fiber layer.

4. The method as defined in claim 3 being particularly characterized in that said glass fiber layer is applied about the surface of said generally rigid insulation layer in a plurality of wraps.

5. The method as defined in claim 1 being particularly characterized in that said heat shrinkable fluorinated ethylene-propylene has a post-shrink band diameter at least about 25 percent less than the outer diameter of said base bonding surface.

6. The method as defined in claim 1 being particularly characterized in that said first generally rigid insulation layer is a layer of Mica.

7. The method of preparing an electrical insulation barrier over the exterior surface of a cylindrical electrically conductive rotor surface which comprises:
   a. applying a first generally rigid electrical insulation layer to said exterior surface area;
   b. applying a layer of a curable electrical insulating adhesive composition to the outer surface of said first insulation layer to form an annular base bonding surface;
   c. applying a generally flat endless band of heat shrinkable fluorinated ethylene-propylene over said adhesive film to cover said base bonding surface, said band normally having a diameter slightly greater than the diameter of said cylindrical rotor surface, but slightly less than the diameter of said cylindrical rotor surface upon undergoing thermal shrinkage; and
   d. exposing said band to thermal energy adequate to cause thermal shrinkage therein until said band shrinks to a normal free diameter significantly less than that of said annular base bonding surface and becomes firmly bonded thereto and the adhesive film becomes fully cured.

8. The method as defined in claim 7 being particularly characterized in that said electrically insulating adhesive composition is an epoxy base adhesive, and wherein said adhesive is subjected to elevated temperatures until cured to a rigid synthetic resinous mass.

9. The method as defined in claim 7 being particularly characterized in that said heat shrinkable fluorinated ethylene-propylene has a post-shrink band diameter of about 30 percent less than the outer diameter of said cylindrical rotor.

10. The method as defined in claim 7 being particularly characterized in that said first generally rigid insulation layer is a layer of Mica.

* * * * *

UNITED STATES PATENT OFFICE
CERTIFICATE OF CORRECTION

Patent No. 3,848,332     Dated November 19, 1974

Inventor(s) Carl R. Bergquist, Jr.

It is certified that error appears in the above-identified patent and that said Letters Patent are hereby corrected as shown below:

Column 4, Claim 1, line 28, after the word "including" insert -- an electrically conductive commutator outer surface and --. Line 34, after the word "and" insert -- having an electrical insulation barrier electrically --. Line 40, delete the word "therefrom" and put instead -- from said conductive commutator outer surface --. Line 48, delete the word "a" and put instead -- an inner --. Line 49, after the word "the" insert -- outer --. Lines 49 and 50, delete the words "spacer means" and put instead -- base bonding surface --. Line 50, after the word "the" insert -- outer --. Line 51, delete the words "spacer means" and put instead -- base bonding surface --. Line 53, after the word "said" insert -- endless --. Line 55, after the word "diameter" insert -- having an inner diametrical dimension --. Line 56, delete the word "that" and put instead -- the outer diameter --. Line 56, delete the words "spacer means" and put instead -- base bonding surface --. Line 56, after the word "and" insert -- until said band --. Line 58, after the word "film" insert -- portion thereof becomes --.

Column 5, Claim 5, line 7, after the word "post-shrink" insert -- inner --. Claim 6, line 12, the word "Mica" should read -- mica --. Claim 7, line 25, delete the word "a" and put instead -- an inner --.

UNITED STATES PATENT OFFICE
CERTIFICATE OF CORRECTION

Patent No. 3,848,332                    Dated November 19, 1974

Inventor(s) Carl R. Bergquist, Jr.               Page - 2

It is certified that error appears in the above-identified patent and that said Letters Patent are hereby corrected as shown below:

Column 6, in Claim 7, line 1, after the word "the" insert -- outer --. Line 2, after the word "the" insert -- outer --. Line 7, after the word "diameter" insert -- having an inner diametrical dimension --. Line 8, delete the word "that" and put instead -- the outer diametrical dimension --. Line 9, after the word "and" insert -- until --. Line 18, after the word "band" insert -- inner diametrical dimension --. Line 18 and line 19, delete the word "diameter". Line 19, delete the word "diameter" (second occurrence) and put instead -- diametrical dimension --. Line 24, the word "Mica" should read -- mica --.

Signed and sealed this 4th day of February 1975.

(SEAL)
Attest:

McCOY M. GIBSON JR.                C. MARSHALL DANN
Attesting Officer                  Commissioner of Patents